United States Patent
Huang et al.

(10) Patent No.: US 11,210,904 B2
(45) Date of Patent: Dec. 28, 2021

(54) GAME MACHINE WITH CONTROLLABLE OPENING ANGLE

(71) Applicants: Nien-Chang Huang, New Taipei (TW); Liang-Yi Ho, New Taipei (TW)

(72) Inventors: Nien-Chang Huang, New Taipei (TW); Liang-Yi Ho, New Taipei (TW)

(73) Assignee: IBASE Gaming Inc., New Taipei (TW)

( * ) Notice: Subject to any disclaimer, the term of this patent is extended or adjusted under 35 U.S.C. 154(b) by 0 days.

(21) Appl. No.: 17/033,708

(22) Filed: Sep. 26, 2020

(65) Prior Publication Data

US 2021/0201627 A1 Jul. 1, 2021

(30) Foreign Application Priority Data

Dec. 25, 2019 (TW) .................................. 108217176

(51) Int. Cl.
*A63F 13/90* (2014.01)
*G07F 17/32* (2006.01)
*G07F 17/34* (2006.01)

(52) U.S. Cl.
CPC .......... *G07F 17/3262* (2013.01); *A63F 13/90* (2014.09); *G07F 17/3213* (2013.01); *G07F 17/3216* (2013.01); *G07F 17/34* (2013.01)

(58) Field of Classification Search
CPC .. G07F 17/3216; G07F 17/3262; A63F 13/90; E05Y 2900/608
See application file for complete search history.

(56) References Cited

U.S. PATENT DOCUMENTS

| | | | |
|---|---|---|---|
| 2008/0113821 A1* | 5/2008 | Beadell | G07F 17/32 463/46 |
| 2021/0035402 A1* | 2/2021 | Rye | G07F 17/34 |
| 2021/0095505 A1* | 4/2021 | Chaudhari | E05D 3/16 |

* cited by examiner

*Primary Examiner* — David L Lewis
*Assistant Examiner* — Robert E Mosser

(57) ABSTRACT

A game machine with a controllable an opening angle is characterized in that: including: a main body, having two lateral plates, an accommodation space and a mounting rod, wherein a front end of the accommodation space has a front opening; a movable gate, disposed at the front opening, wherein a rear end of the movable gate has a pivotal part pivoted to top end of the main body; and a movable mounting rack, having one end thereof disposed at a rear end of the movable gate and having two lateral mounting plates and at least one connection rod between the two lateral mounting plates, the lateral mounting plates are disposed at two sides of the movable mounting rack, the lateral mounting plates correspondingly have at least two mounting slots allowing the mounting rod to be mounted; a retractable rod is disposed between the moveable gate and the main body.

8 Claims, 5 Drawing Sheets

GAME MACHINE WITH CONTROLLABLE OPENING ANGLE

BACKGROUND OF THE INVENTION

1. Field of the Invention

The present invention relates to a charging device, especially to a game machine with a controllable an opening angle allowing an inner light source of a spiral lighting unit to fully emit out.

2. Description of Related Art

In a conventional game machine, a door plate for a front end of a main body thereof is fixed by utilizing screws, when a repairing or a maintaining operation is desired to be processed, there are two operators required to work together for respectively holding the door plate and utilizing a tool to sequentially removing the screws, so that the door plate can be detached, when the repairing or the maintaining operation is finished, there are also two operators required to respectively hold the door plate and utilizing the tool to sequentially locking the screws; as such, the above-mentioned structure cannot allow single operator to finish the repairing or the maintain operation, and the door plate cannot be opened and controlled in different angles according to operation requirement, thus the operation is time consuming, labor consuming and inconvenience, and the practicability is very much limited, and the shortages existed in the prior art shall be improved by the skilled people in the art.

SUMMARY OF THE INVENTION

For solving the shortages existed in the prior art, one primary objective of the present invention is to provide a game machine with a controllable an opening angle, in which a mounting rod is disposed in a main body and a moveable mounting rack is disposed on a moveable gate, for solving the shortages existed in the prior art.

Another objective of the present invention is to provide a game machine with a controllable an opening angle, in which a retractable rod is disposed between a moveable gate and a main body.

Another objective of the present invention is to provide a game machine with a controllable an opening angle, in which a pivotal part of a moveable gate pivoted to a top end of the main body can be severed as a pivot for allowing the moveable gate to be rotated with a certain angle for being opened or closed, and the moveable gate can be mounted with a mounting rod of the main body through a moveable mounting rack with a mounting slot.

One another objective of the present invention is to provide a game machine with a controllable an opening angle, which has advantages of effectively increasing the operation convenience and allowing a single hand of a user to rotate the moveable gate with a certain angle for opening or closing the moveable gate.

The problem to be solved by the present invention is that: in a conventional game machine, a door plate for a front end of a main body thereof is fixed by utilizing screws, when a repairing or a maintaining operation is desired to be processed, there are two operators required to work together for respectively holding the door plate and utilizing a tool to sequentially removing the screws, so that the door plate can be detached, when the repairing or the maintaining operation is finished, there are also two operators required to respectively hold the door plate and utilizing the tool to sequentially locking the screws; as such, the above-mentioned structure cannot allow single operator to finish the repairing or the maintain operation, and the door plate cannot be opened and controlled in different angles according to operation requirement, thus the operation is time consuming, labor consuming and inconvenience, and the practicability is very much limited.

For achieving the aforesaid objectives, one technical solution provided by the present invention is to provide a game machine with a controllable an opening angle, characterized in that: including:

a main body, having two lateral plates at two sides thereof and an accommodation space being defined therein, wherein a front end of the accommodation space of the main body has a front opening, an upper portion of the accommodation space defined between the two lateral plates and adjacent to an upper portion of the front opening is transversally disposed with a mounting rod;

a movable gate, disposed at the front opening of the main body, wherein a rear end of the movable gate has a pivotal part pivoted to a top end of the main body, so that the pivotal part is served as a pivot for allowing the movable gate to be rotated with a certain angle for being closed or opened; and a movable mounting rack, having one end thereof disposed at a rear end of the movable gate and adjacent to the pivotal part, wherein the movable mounting rack has two lateral mounting plates and at least one connection rod, the lateral mounting plates are disposed at two sides of the movable mounting rack, the lateral mounting plates correspondingly have at least two mounting slots allowing the mounting rod of the main body to be mounted, and the connection rod is connected between the two lateral mounting plates;

accordingly, a mounting status of the at least one mounting slot of the movable mounting rack and the mounting rod of the main body is able to control the movable gate to be opened at different angles.

Wherein, according to the present invention, a retractable rod is provided at a rear end of the movable gate and adjacent to the pivotal part and the accommodation space of the main body and adjacent to a middle portion of the front opening.

Wherein, according to the present invention, a displayer is disposed at a front end of the movable gate.

Wherein, according to the present invention, the mounting rod is a circular mounting rod.

Wherein, according to the present invention, a rear end defined at the upper portion of the main body is downwardly and obliquely extended with an inclined angle.

Wherein, according to the present invention, an upper portion of the movable gate is protruded out from the main body.

Wherein, according to the present invention, the mounting slot has a first mounting slot located at an upper segment and a second mounting slot located at a lower segment, wherein, a bottom concave part is formed in the first mounting slot and extended for allowing the mounting rod of the main body to be fastened, a guiding inclined slope allowing the mounting rod to be guided is formed at the bottom concave part and an outer side of the lateral mounting plate, and a top concave part is formed in the second mounting slot and extended for allowing the mounting rod of the main body to be fastened.

Wherein, according to the present invention, the retractable rod is an air-pressure retractable rod or an oil-pressure retractable rod.

Advantages achieved by the present invention are as follows: according to the present invention, the mounting rod is disposed on the main body, the movable mounting rack is disposed on the movable gate and the retractable rod is disposed between the movable gate and the main body; accordingly, the pivotal part of the movable gate pivoted at the top end of the main body can be served as the pivot for allowing the movable gate to be rotated with a certain angle for being closed or opened, and the movable gate enables the mounting rod of the main body to be mounted through the movable mounting rack having the mounting slot; the operation convenience can be effectively increased, and the movable gate can be rotated to different angles for being controlled to be opened or closed via a single hand of a user. Accordingly, the present invention is novel and more practical in use comparing to prior arts.

BRIEF DESCRIPTION OF CODES

Figure 1:
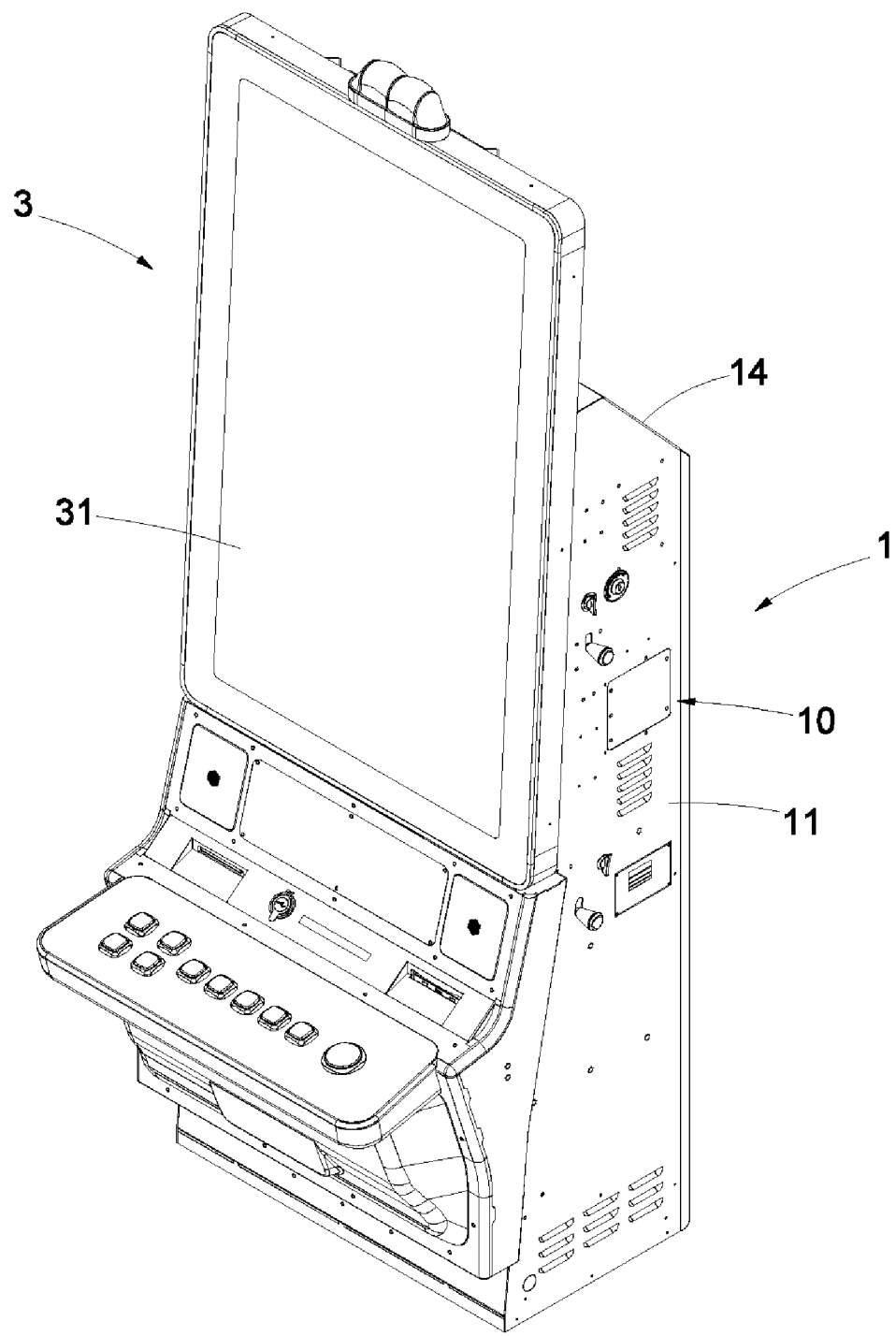
FIG. 1 is a perspective view showing the assembly of the moveable gate being closed according to the present invention.

1: Main body
10: Accommodation space
11: Lateral plate
12: Front opening
13: Mounting rod
14: Inclined angle
2: Moveable mounting rack
20: Connection rod
21: Lateral mounting plate
22: Mounting slot
221: First mounting slot
2210: Guiding inclined slope
2211: Bottom concave part
222: Second mounting slot
2221: Top concave part
3: Moveable gate
30: Pivotal part
31: Displayer
4: Retractable rod

DETAILED DESCRIPTION OF THE PREFERRED EMBODIMENT

One preferred embodiment of the present invention will be described with reference to the drawings for illustrating the structural assembly, the technical means and the functions to be achieved by the present invention; and the actual ratios and the arrangement of components shall not be limited by the ratios and the arrangement of components in the provided figures.

Figure 2:
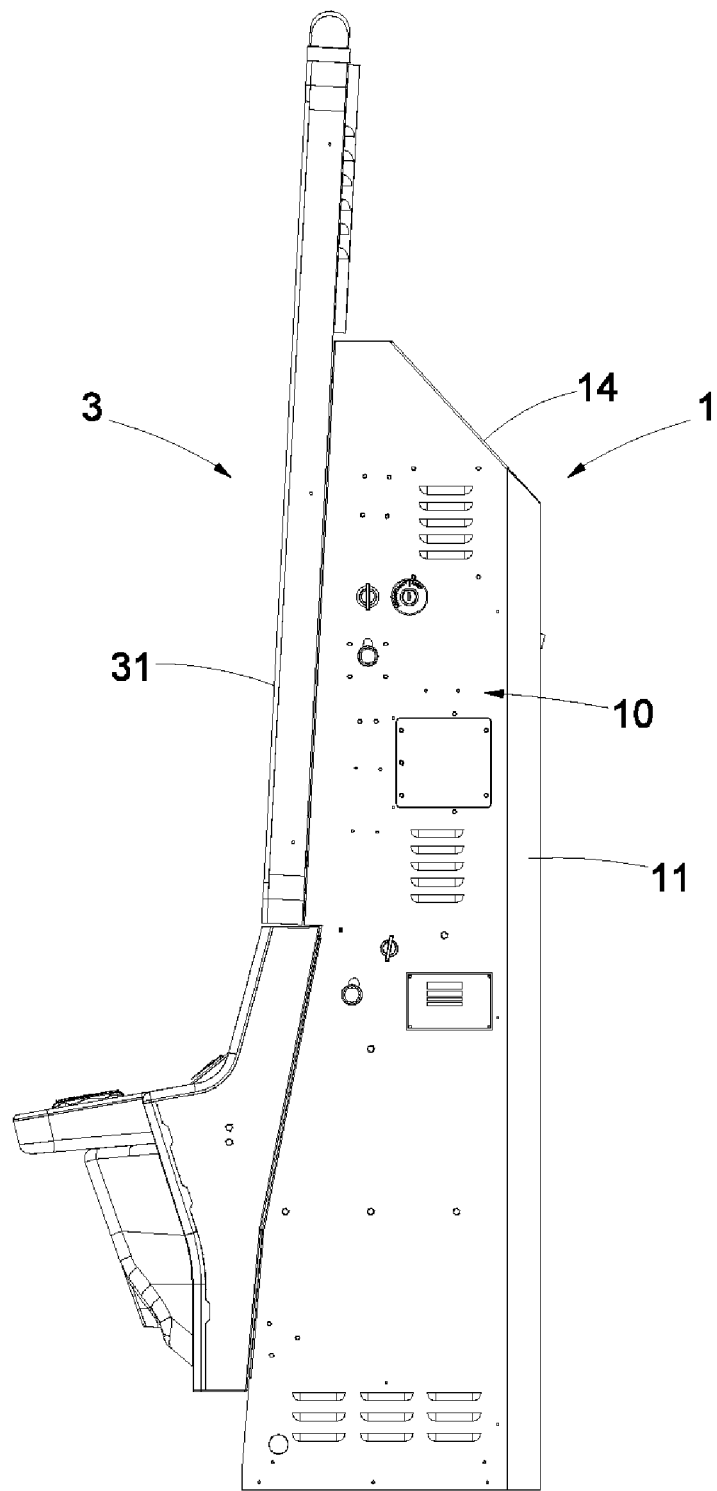
FIG. 2 is a side view showing the moveable gate being closed according to the present invention.
Figure 3:
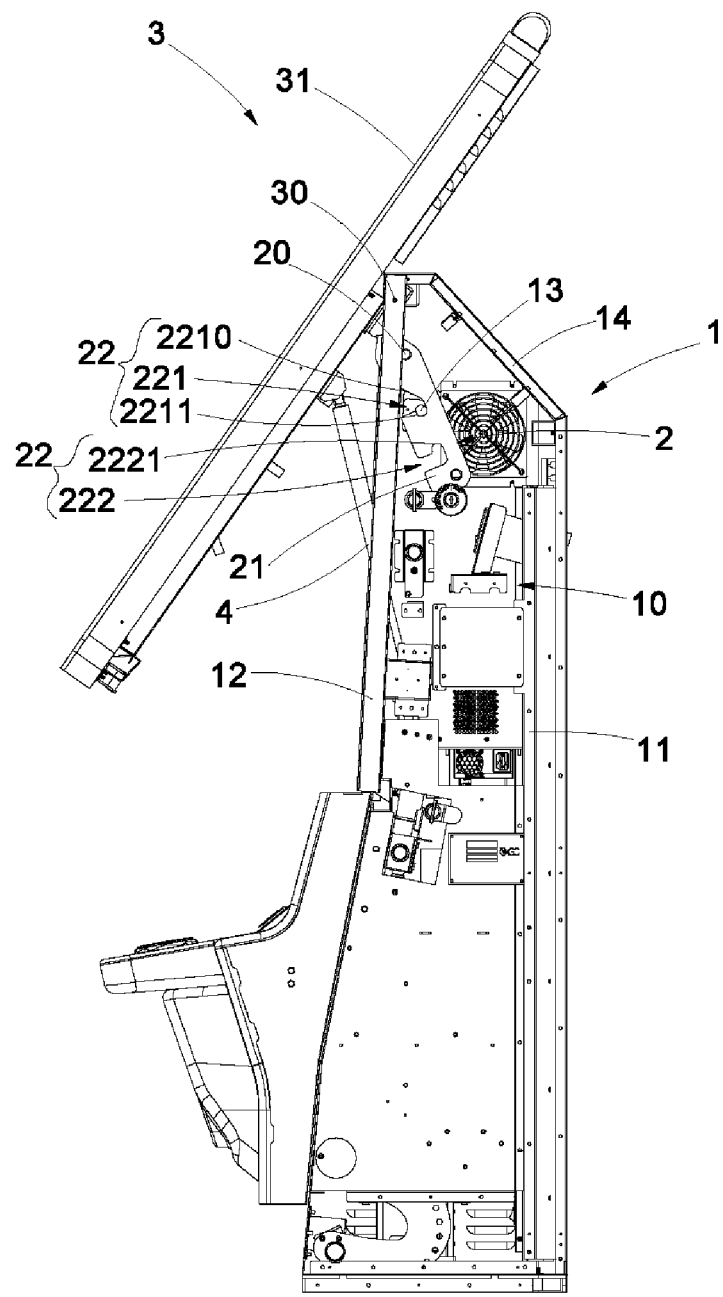
FIG. 3 is a cross sectional view showing the assembly of the moveable gate being opened with a small angle according to the present invention.
Figure 4:
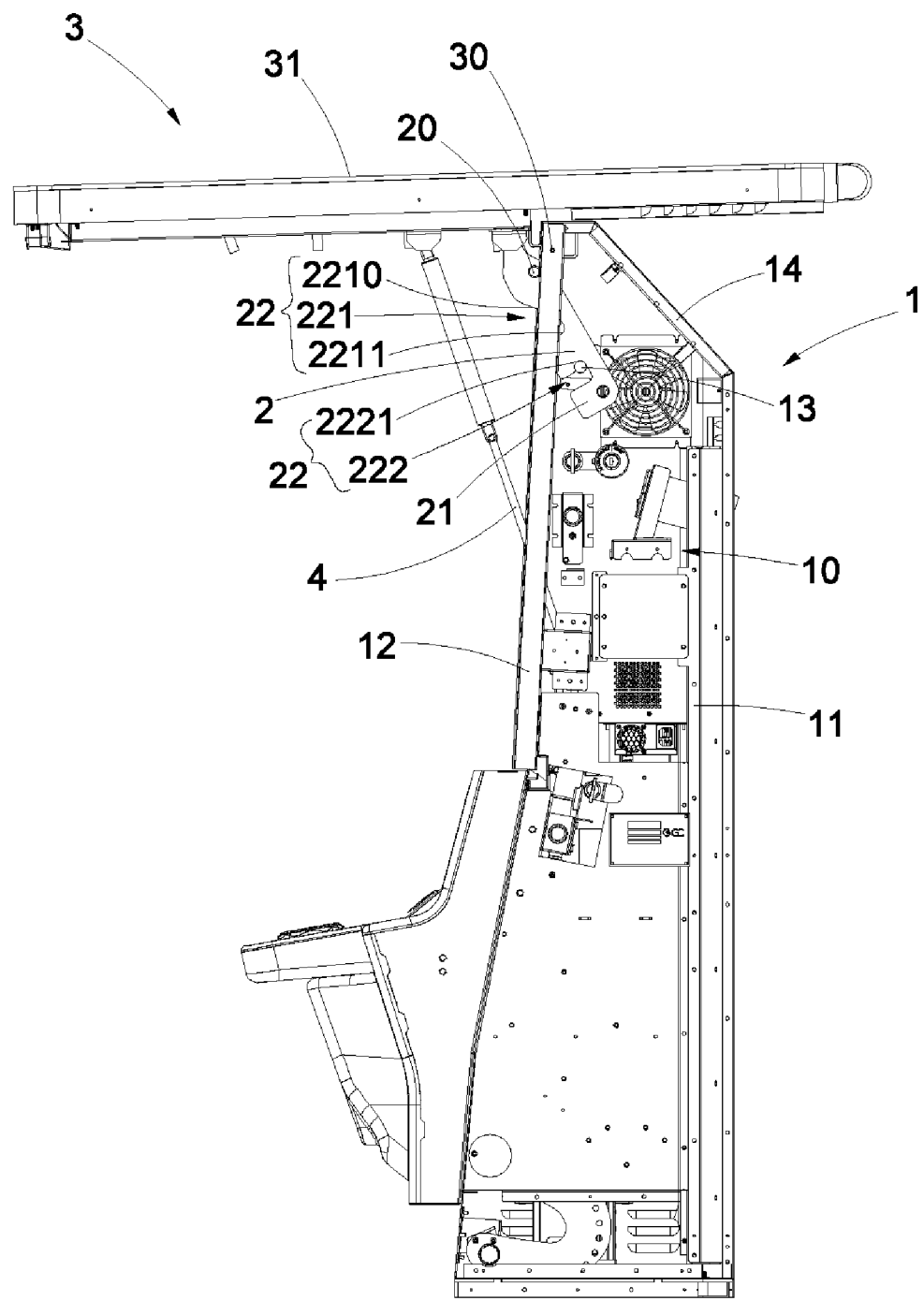
FIG. 4 is a cross sectional view showing the assembly of the moveable gate being opened with a large angle according to the present invention.
Figure 5:
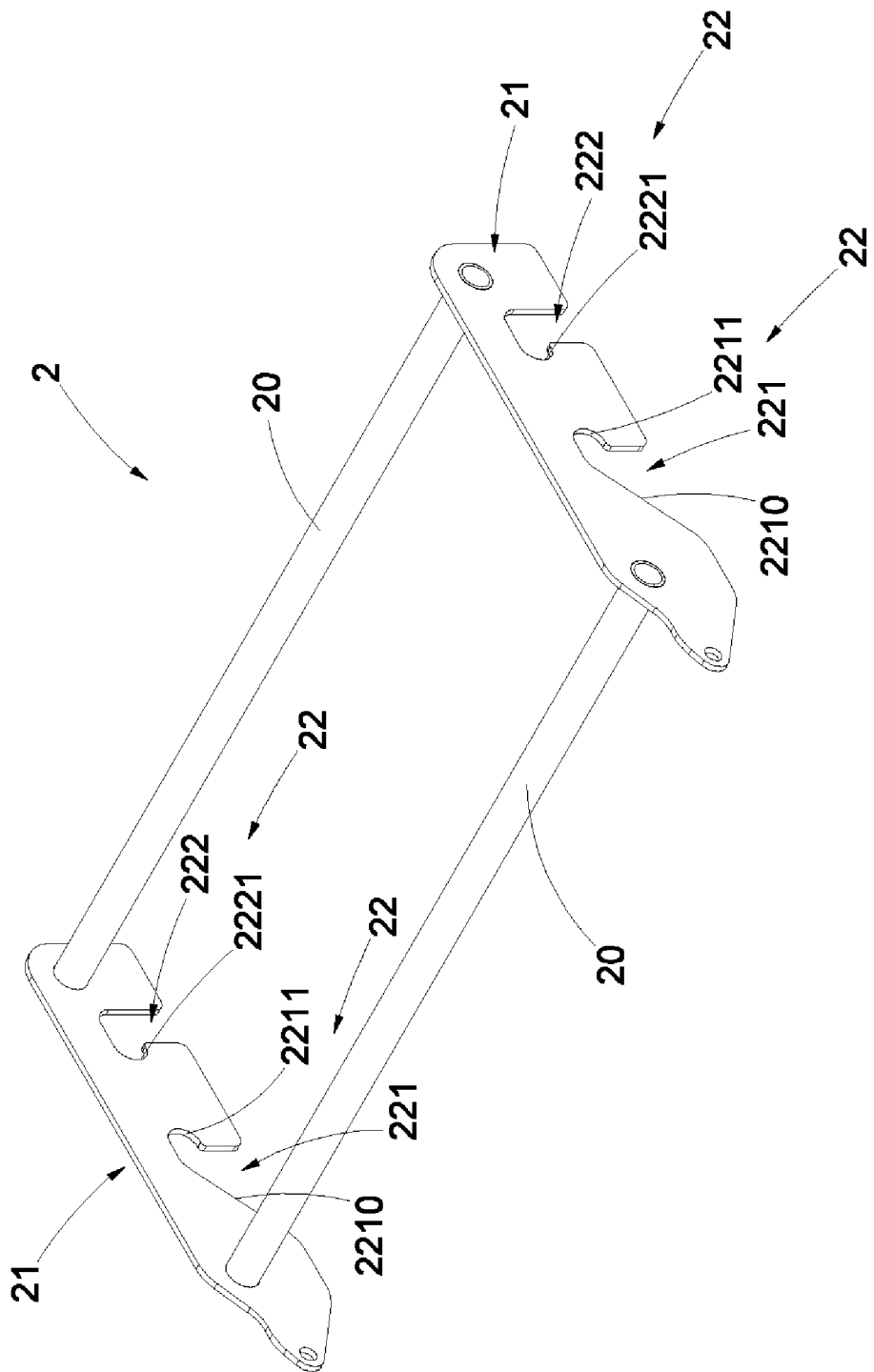
FIG. 5 is a perspective view showing the moveable mounting rack according to the present invention.

Please refer from FIG. 1 to FIG. 5, wherein FIG. 1 is a perspective view showing the assembly of the moveable gate being closed according to the present invention; FIG. 2 is a side view showing the moveable gate being closed according to the present invention; FIG. 3 is a cross sectional view showing the assembly of the moveable gate being opened with a small angle according to the present invention; FIG. 4 is a cross sectional view showing the assembly of the moveable gate being opened with a large angle according to the present invention; and FIG. 5 is a perspective view showing the moveable mounting rack according to the present invention. According to one preferred embodiment of the present invention, a game machine with a controllable opening angle including a main body 1, a movable gate 3 and a movable mounting rack 2 is disclosed.

The main body 1 has two lateral plates 11 at two sides thereof and an accommodation space 11 is defined therein, a front end of the accommodation space 10 of the main body 1 has a front opening 12, an upper portion of the accommodation space 10 defined between the two lateral plate 11 and adjacent to an upper portion of the front opening 12 is transversally disposed with a mounting rod 13; according to this embodiment, the mounting rod 13 is a circular mounting rod, but what shall be addressed is that the scope of the present invention is not limited to the above-mentioned arrangement, for providing an installing convenience, a rear end defined at the upper portion of the main body 1 is downwardly and obliquely extended with an inclined angle 14 (as shown in FIG. 1, FIG. 2, FIG. 3 and FIG. 4)

The movable gate 3 is disposed at the front opening 12 of the main body 1, and a rear end of the movable gate 3 has a pivotal part 30 pivoted to a top end of the main body 1, so that the pivotal part 30 can be served as a pivot for allowing the movable gate 3 to be rotated for a certain angle for being closed or opened; according to this embodiment, an upper portion of the movable gate 3 is protruded out from the main body 1, and a displayer 31 (as shown in FIG. 1, FIG. 2, FIG. 3 and FIG. 4) is disposed at a front end of the movable gate 3.

The movable mounting rack 2 has one end thereof disposed at a rear end of the movable gate 3 and adjacent to the pivotal part 30, the movable mounting rack 2 has two lateral mounting plates 21 and at least one connection rod 20, wherein the lateral mounting plates 21 are disposed at two sides of the movable mounting rack 2, the lateral mounting plates 21 have correspondingly at least two mounting slots 22 allowing the mounting rod 13 of the main body 1 to be mounted, the connection rod 20 is connected between the two lateral mounting plates 21, the mounting slot 22 has a first mounting slot 221 located at an upper segment and a second mounting slot 222 located at a lower segment, wherein, a bottom concave part 2211 is formed in the first mounting slot 221 and extended for allowing the mounting rod 13 of the main body 1 to be fastened, a guiding inclined slope 2210 allowing the mounting rod 13 to be guided is formed at the bottom concave part 2211 and an outer side of the lateral mounting plate 21, and a top concave part 2221 is formed in the second mounting slot 222 and extended for allowing the mounting rod 13 of the main body 1 to be fastened (as shown in FIG. 1, FIG. 2, FIG. 3, FIG. 4 and FIG. 5); moreover, the present invention is also provided with a retractable rod 4 at a rear end of the movable gate 3 and adjacent to the pivotal part 30 and the accommodation space 10 of the main body 1 and adjacent to a middle portion of the front opening 12; and the retractable rod 4 is an air-pressure retractable rod or an oil-pressure retractable rod, but what shall be addressed is that the scope of the present invention is not limited to the above-mentioned arrangement.

When the present invention is in use, because the retractable rod 4 itself has extending forces towards two ends, when the movable gate 3 of the present invention is engaged with the opening 12 of the main body 1, the retractable rod 4 is in a compressed and shorten status, when the movable gate 3 is opened, the pivotal part 30 disposed at the rear end of the movable gate 3 and pivoted to the top end of the main body 1 can be served as a rotating pivot for allowing the movable gate 3 to be upwardly rotated with a certain angle for being opened, at this moment the retractable rod 4 is yet fully stretched, the movable mounting rack 2 is able to drive the mounting rod 13 of the main body 1 to slide into the bottom concave part 2211 for being positioned through the weight of the movable mounting rack 2 or an external force applied to the connection rod 20 (as shown in FIG. 3); when the movable gate 3 is fully and upwardly opened, the mounting rod 13 can be released from the bottom concave part 2211 through pulling the movable mounting rack 2, thus the movable gate 3 is able to be upwardly rotated with the pivotal part 30 being served as a pivot and through the extending forces towards two ends applied by the retractable rod 4, at this moment the movable mounting rack 2 is able to drive the mounting rod 13 of the main body 1 to slide into the top concave part 2221 through the weight of the movable mounting rack 2 or an external force applied to the connection rod 20, because the retractable rod 4 has the extending forces towards two ends, so that the mounting rod 13 can be provided with an upward force for being positioned in the top concave part 2221 (as shown in FIG. 4); when the movable gate 3 is desired to be closed at the front opening 12 of the main body 1, the aforesaid operation is reversely processed for allowing the movable gate 3 to be engaged with the front opening 12 of the main body 1 (as shown in FIG. 1 and FIG. 2); according to the present invention, the mounting status of the at least one mounting slot 22 of the movable mounting rack 2 and the mounting rod 13 of the main body 1 can control the movable gate 3 to be opened at different angles.

As such, according to the present invention, the mounting rod 13 is disposed on the main body 1, the movable mounting rack 2 is disposed on the movable gate 3 and the retractable rod 4 is disposed between the movable gate 3 and the main body 1; accordingly, the pivotal part 30 of the movable gate 3 pivoted at the top end of the main body 1 can be served as the pivot for allowing the movable gate 3 to be rotated with a certain angle for being closed or opened, and the movable gate 3 enables the mounting rod 13 of the main body 1 to be mounted through the movable mounting rack 2 having the mounting slot 22; the operation convenience can be effectively increased, and the movable gate 3 can be rotated to different angles for being controlled to be opened or closed via a single hand of a user. Accordingly, the present invention is novel and more practical in use comparing to prior arts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A game machine with a controllable an opening angle, characterized in that: including:
   a main body, having two lateral plates at two sides thereof and an accommodation
   space being defined therein, wherein a front end of the accommodation space of the main body has a front opening, an upper portion of the accommodation space defined between the two lateral plates and adjacent to an upper portion of the front opening is transversally disposed with a mounting rod;
   a movable gate, disposed at the front opening of the main body, wherein a rear end of
   the movable gate has a pivotal part pivoted to a top end of the main body;
   a movable mounting rack, having one end thereof disposed at a rear end of the movable gate and adjacent to the pivotal part, wherein the movable mounting rack has two lateral mounting plates and at least one connection rod, the lateral mounting plates are disposed at two sides of the movable mounting rack, the lateral mounting plates correspondingly have at least two mounting slots allowing the mounting rod of the main body to be mounted, and the connection rod is connected between the two lateral mounting plates;
   accordingly, a mounting status of the at least one mounting slot of the movable mounting rack and the mounting rod of the main body is able to control the movable gate to be opened at different angles.

2. The game machine with a controllable the opening angle as claimed in claim 1, wherein a retractable rod is provided at a rear end of the movable gate and adjacent to the pivotal part and the accommodation space of the main body and adjacent to a middle portion of the front opening.

3. The game machine with a controllable the opening angle as claimed in claim 2, wherein a displayer is disposed at a front end of the movable gate.

4. The game machine with a controllable the opening angle as claimed in claim 3, wherein the mounting slot has a first mounting slot located at an upper segment and a second mounting slot located at a lower segment, wherein, a bottom concave part is formed in the first mounting slot and extended for allowing the mounting rod of the main body to be fastened, a guiding inclined slope allowing the mounting rod to be guided is formed at the bottom concave part and an outer side of the lateral mounting plate, and a top concave part is formed in the second mounting slot and extended for allowing the mounting rod of the main body to be fastened.

5. The game machine with a controllable the opening angle as claimed in claim 2, wherein the retractable rod is an air-pressure retractable rod or an oil-pressure retractable rod.

6. The game machine with a controllable the opening angle as claimed in claim 1 to 3, wherein the mounting rod is a circular mounting rod.

7. The game machine with a controllable the opening angle as claimed in claim 1 to 3, wherein a rear end defined at the upper portion of the main body is downwardly and obliquely extended with an inclined angle.

8. The game machine with a controllable the opening angle as claimed in claim 1 to 3, wherein an upper portion of the movable gate is protruded out from the main body.

* * * * *